(12) United States Patent
Chung

(10) Patent No.: US 8,079,239 B2
(45) Date of Patent: Dec. 20, 2011

(54) KEY INTERLOCK DEVICE

(75) Inventor: Jin Sang Chung, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 242 days.

(21) Appl. No.: 12/465,489

(22) Filed: May 13, 2009

(65) Prior Publication Data
US 2010/0107709 A1    May 6, 2010

(30) Foreign Application Priority Data

Nov. 4, 2008 (KR) .................. 10-2008-0108919

(51) Int. Cl.
  *B60R 25/02* (2006.01)
  *B60R 25/04* (2006.01)
  *E05B 65/12* (2006.01)
(52) U.S. Cl. ............... 70/252; 70/182; 70/183; 70/186; 70/187; 70/189; 192/105 CD; 192/103 B; 192/105 BB; 192/223.1

(58) Field of Classification Search .................... 70/188, 70/184, 187, 189, 182, 183, 252, 181, 186; 192/105 BB, 223.1
See application file for complete search history.

(56) References Cited

U.S. PATENT DOCUMENTS 2,521,943 A * 9/1950 Pitt ............................ 192/103 B
7,070,035 B2 * 7/2006 Wians .................... 192/105 CD

* cited by examiner

*Primary Examiner* — Lloyd Gall
*Assistant Examiner* — David E Sosnowski
(74) *Attorney, Agent, or Firm* — Morgan, Lewis & Bockius LLP

(57) ABSTRACT

A key interlock device includes a body, a camshaft provided in the body so as to be rotated by manipulation of an ignition key, and at least an anti-rotation member provided in the camshaft and being engaged with the body when the camshaft rotates beyond a predetermined speed in one direction to restrict rotation of the camshaft but being disengaged with the body when the camshaft rotates in a reverse direction.

9 Claims, 4 Drawing Sheets

KEY INTERLOCK DEVICE

CROSS-REFERENCE TO RELATED APPLICATIONS

The present application claims priority to Korean Patent Application Number 10-2008-0108919, filed on Nov. 4, 2008, the entire contents of which are incorporated herein for all purposes by this reference.

BACKGROUND OF THE INVENTION

1. Field of the Invention

The present invention relates generally to a key interlock device and, more particularly, to a key interlock device for preventing removal of an ignition key.

2. Description of Related Art

Generally, for safety reasons, a typical key interlock device is provided in a vehicle so that an ignition key can be removed from an ignition switch only when the shift lever of a transmission is located in the position of Parking (P). The key interlock device is responsible for preventing the removal of the ignition key when the shift lever is located at a position other than the position of 'P.'

However, when the shift lever is located at a position other than the position of 'P' during traveling, the operation of the key interlock device is frequently made, and thus operational noise is generated, with the result that emotional quality is lowered.

Recently, in order to solve this problem, efforts have been actively made to develop devices for reducing such operational noise. As an example of such devices, a key interlock control system is disclosed in Korean Pat. Application. No. 2008-51023.

The key interlock control system receives an 'IG1' signal, which is generated when an ignition key is located at the position of an 'ON' or 'START' terminal, in addition to a 'P' signal, thus preventing a key interlock device from operating during traveling. Accordingly, the key interlock control system increases the endurance life of the key interlock device by preventing overheating from occurring due to the continuous flow of current through a solenoid.

However, in the case where the solenoid is located in the vicinity of an 'ACC' terminal to block the rotation of a camshaft, as shown in FIG. 1, the 'IG1' signal, which is used as a trigger signal for actuating the solenoid, is changed from an ON state to an OFF state. In this case, the angle that is needed to rotate the ignition key to a key interlock block position (the position of the 'ACC' terminal), so that the ignition key is returned to the position of a 'LOCK terminal' before the rotation of the camshaft is blocked by the solenoid if an ignition key is rather quickly turned. Accordingly, a problem occurs in that the removal of the ignition key may be made even when a shift lever is located at a position other than the position of 'P'.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a key interlock device, which, when the speed of rotation of an ignition key is faster than the speed of operation of a solenoid, enables the ignition key to be rotated to the position of a 'LOCK' terminal, thus preventing removal of the ignition key.

In an aspect of the present invention a body, a camshaft provided in the body so as to be rotated by manipulation of an ignition key, and at least an anti-rotation member provided in the camshaft and being engaged with the body when the camshaft rotates beyond a predetermined speed in one direction to restrict rotation of the camshaft but being disengaged with the body when the camshaft rotates in a reverse direction, wherein the anti-rotation members are configured to move to the body from the camshaft by a centrifugal force generated to the anti-rotation members when the camshaft rotates beyond the predetermined speed in the one direction to restrict the rotation of the camshaft.

The anti-rotation members may be elastically coupled by at least an elastic member connected to the camshaft, wherein the camshaft includes at least a mounting hole in an outer circumference thereof to receive the anti-rotation members and elastic members therein respectively so that the anti-rotation members relatively move with respect to the camshaft in a radial direction of the camshaft and, wherein the body includes recesses which are formed in an inner circumference thereof in a radial inward direction, the recesses engaging with the anti-rotation members when the camshaft rotates beyond the predetermined speed in the one direction.

A bottom of the respective recesses may be formed of an inclination in the one direction of the rotation so that the anti-rotation members engaged with the recess can be moved back by the elastic member into the mounting hole of the camshaft that is rotating in the reverse direction.

In another aspect of the present invention, the anti-rotation members may be slidably coupled to the camshaft so as to move in a radial direction thereof and formed to have a circular outer plate corresponding to an inner circumference of the body, wherein the anti-rotation members are elastically coupled to the camshaft, wherein an elastic member is located in and coupled to a central portion of the camshaft and wherein the anti-rotation members include holes which are recessed therein and both ends of the elastic member are coupled to the respective hole of the anti-rotation members.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
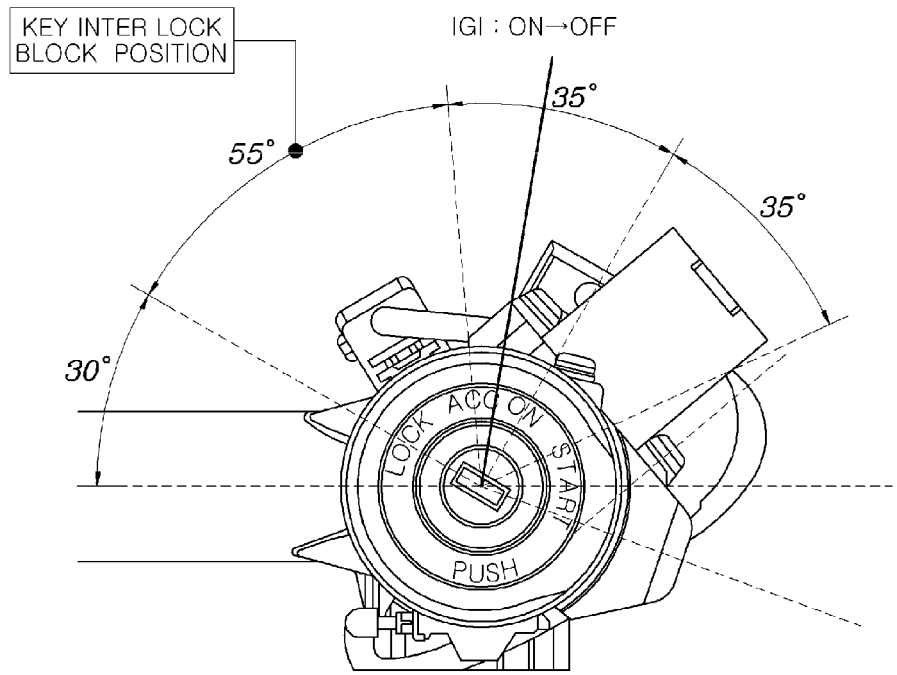
FIG. 1 is a view showing a conventional key interlock device.
Figure 2:
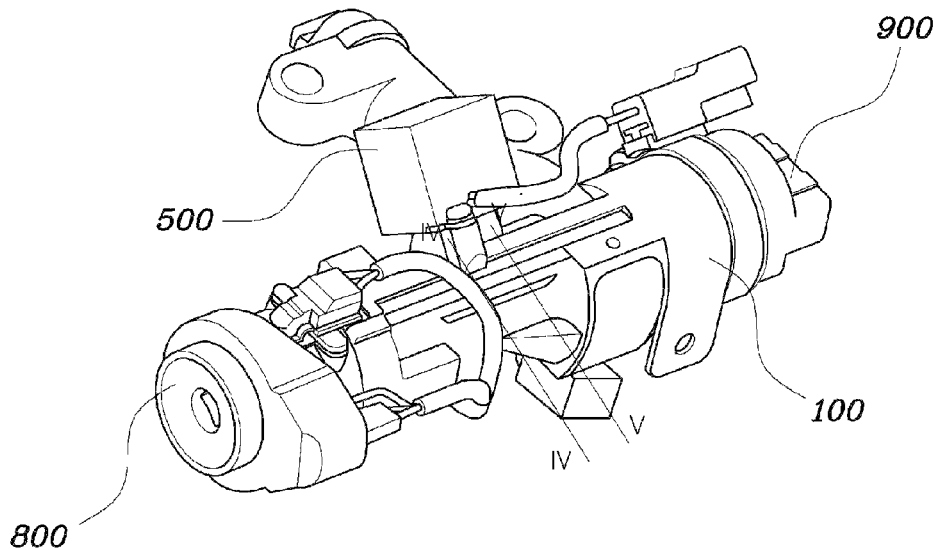
FIG. 2 is a perspective view showing an exemplary key interlock device according to the present invention, in which a starter is provided.
Figure 3:
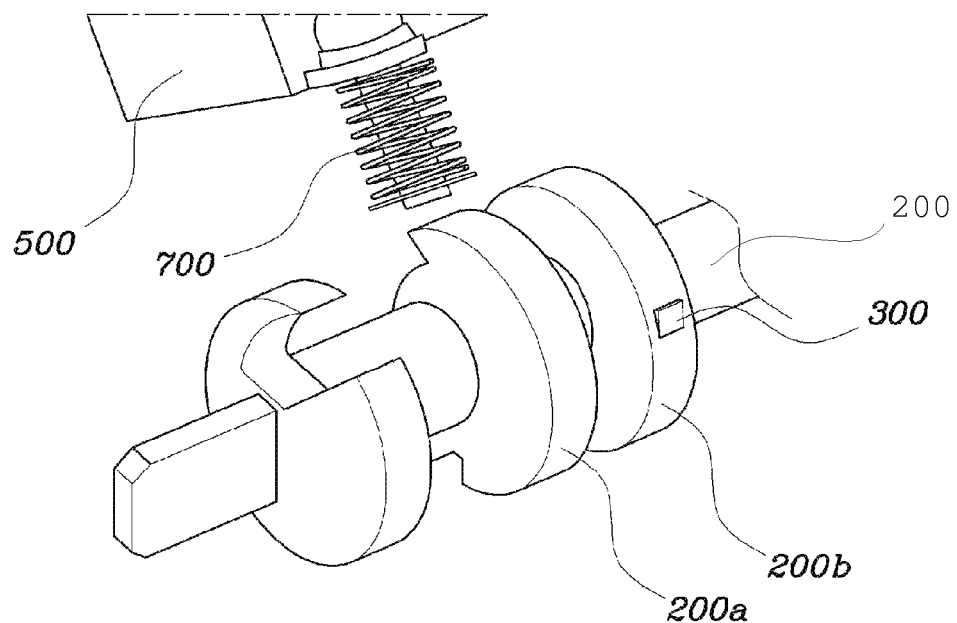
FIG. 3 is a perspective view showing the camshaft of the exemplary key interlock device according to the present invention, in which anti-rotation members are provided.
Figure 4:
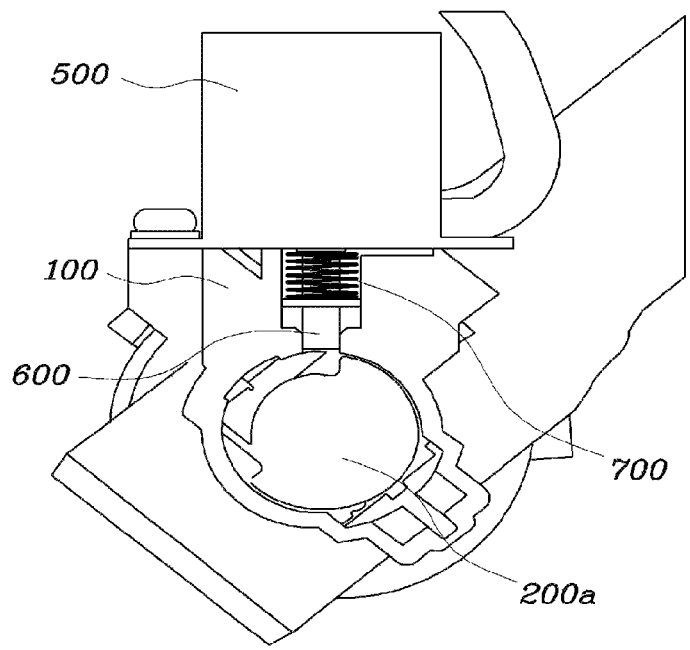
FIG. 4 is a sectional view taken along line IV-IV of the exemplary key interlock device according to the present invention.
Figure 5:
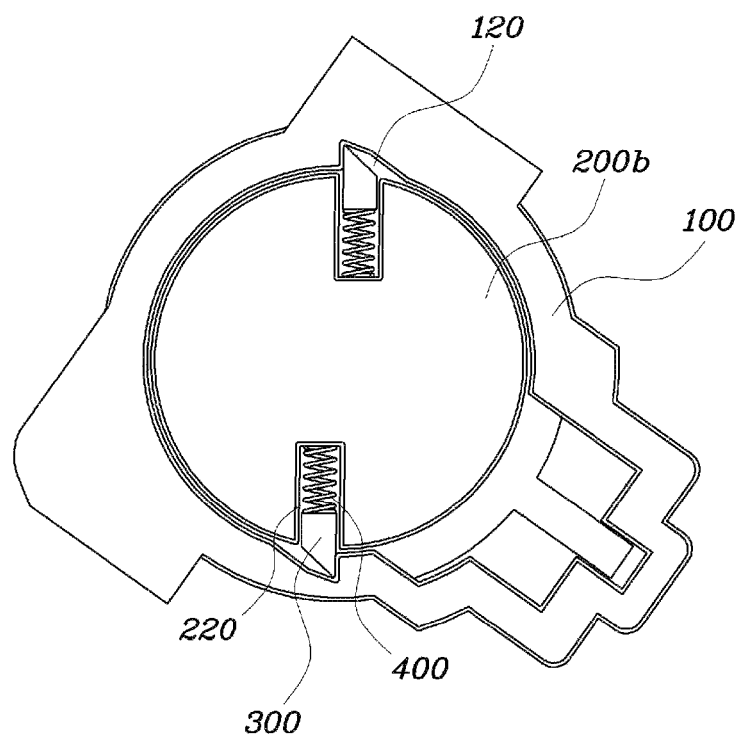
FIG. 5 is a sectional view taken along line V-V of the exemplary key interlock device according to the present invention.
Figure 6:
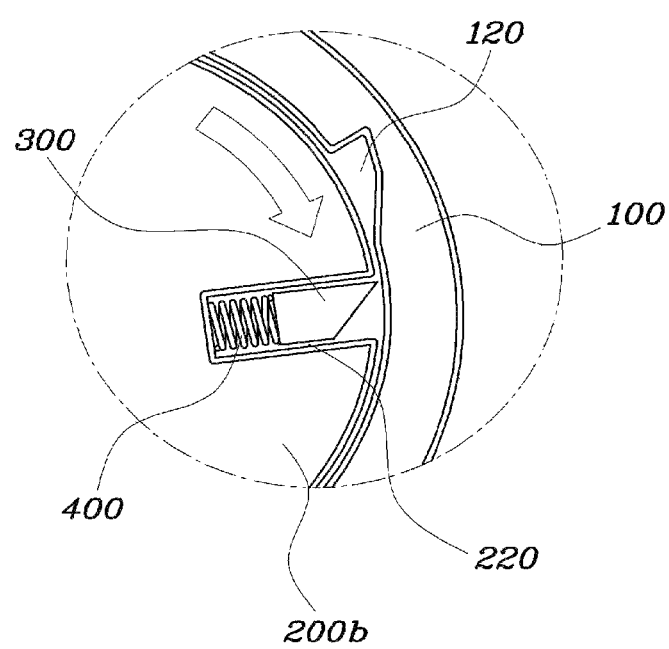
FIGS. 6 and 7 are sectional views illustrating the operation of the exemplary key interlock device according to the present invention.
Figure 7:
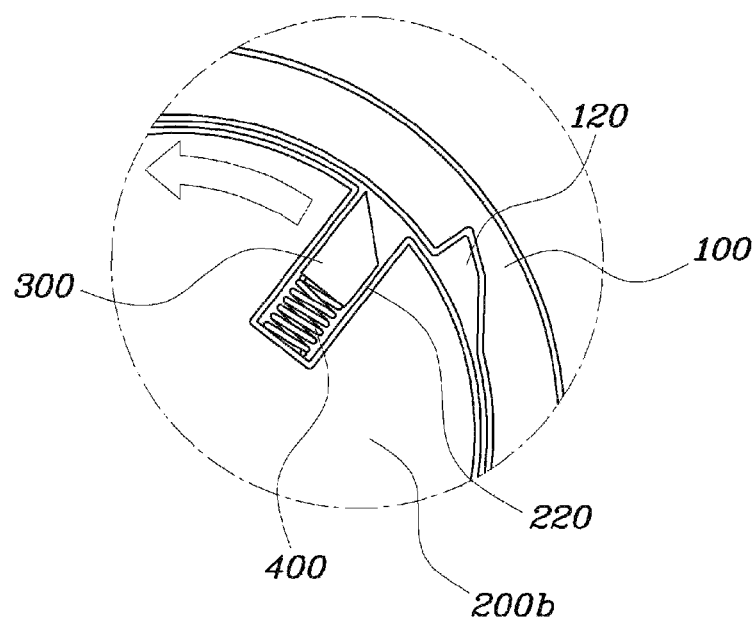

FIG. 2 is a perspective view showing a key interlock device according to various embodiments of the present invention, in which a starter is provided, FIG. 3 is a perspective view showing the camshaft of the key interlock device according various embodiments of to the present invention, in which anti-rotation members are provided, FIG. 4 is a sectional view taken along line IV-IV of the key interlock device according to various embodiments of the present invention, FIG. 5 is a sectional view taken along line V-V of the key interlock device according to the present invention, and FIGS. 6 and 7 are sectional views illustrating the operation of the key interlock device according to various embodiments of the present invention.

Referring to FIGS. 2 to 5, the key interlock device according to various embodiments of the present invention includes a body 100, a camshaft 200 which is provided in the body 100 so as to be rotated by the manipulation of an ignition key and has one or more mounting holes 220 formed in the outer circumference thereof, and anti-rotation members 300 which are provided in the respective mounting holes 220 and are brought into contact with the body 100 by moving out of the camshaft 200 by a centrifugal force generated when the camshaft 200 rotates in the counterclockwise direction beyond a predetermined speed.

The body 100 has a cylindrical shape in which a predetermined space is formed. An ignition key manipulation unit 800 is provided on one side of the body 100. The ignition key manipulation unit 800 is rotated by the manipulation of the ignition key, and is provided with 'LOCK,' 'ACC,' 'ON' and 'START' terminals. When the ignition key is located at the position of any of these terminals by the manipulation thereof, power can be supplied to various electrical parts in a vehicle depending on the position of the ignition key. For this purpose, an ignition switch unit 900 may be provided on the other side of the body 100 so that the supply of power can be performed through the manipulation of the key.

The ignition switch unit 900 includes 'IG1,' 'IG2,' 'ACC,' 'ST', 'B1' and 'B2' terminals. When the ignition key is located at the position of the 'ACC' terminal, the 'B1' terminal is connected with the 'ACC' terminal. In contrast, when the ignition key is located at the position of the 'ON' terminal, the 'B1' terminal is connected with both the 'ACC' terminal and the 'IG1' terminal, whereas the 'B2' terminal is connected with the 'IG2' terminal. Furthermore, when the ignition key is located at the position of the 'START' terminal, the 'B1' terminal is connected with the 'IG1' terminal, whereas the 'B2' terminal is connected with the 'ST' terminal.

Here, the 'IG1' terminal is used to supply power to a fueling circuit, an ignition circuit, an electronic control unit, turn signal lamps and backup lamps, and the 'IG2' terminal is used to supply power to a lighting device, a security device, an air conditioning device and a power window device. Furthermore, the 'ACC' terminal is used to supply power to a vehicle clock and an audio system, and the 'ST' terminal is used to supply power to a starting circuit. The term 'B1' means a battery for supplying power to 'ACC' and 'IG1' terminal-related electrical parts, and the term 'B2' means a battery for supplying power to 'ST' and 'IG2' terminal-related electrical parts.

A solenoid 500 is provided on a side surface of the body 100 to restrict the rotation of the ignition key manipulation unit 800. Accordingly, the rotation of the ignition key manipulation unit 800 can be restricted when the solenoid 500 is actuated. Furthermore, the camshaft 200 is provided in the body 100 so that the rotation of the ignition manipulation unit 800 can be restricted when the solenoid 500 is actuated. The camshaft 200 is connected to the ignition key manipulation unit 800 to rotate in the clockwise or counterclockwise direction according to rotation of the ignition key manipulation unit 800.

The camshaft 200 includes a first camshaft portion 200a and a second camshaft portion 200b, which have circular ring shapes. The first camshaft portion 200a has a predetermined recess formed in the outer circumference thereof in the radial inward direction thereof, and the recess engages in response to the operation of the solenoid 500, whereby the rotation of the camshaft 200 can be prevented. For this purpose, as shown in FIG. 4, a push unit 600 may be provided in the solenoid 500. Furthermore, a spring 700 may be further included to restore the solenoid 500 to its original position.

When power is applied to the solenoid 500, current flows through the solenoid 500. In this state, the solenoid 500 causes the push unit 600 to be pushed out against the elasticity of the spring 700 and to be engaged with the recess formed in the first camshaft portion 200a, thus restricting the motion of the camshaft 200. Accordingly, the removal of the ignition key can be prevented.

Meanwhile, referring to FIG. 3 again, the second camshaft portion 200b is spaced part from the first camshaft portion 200a. The mounting holes 220, for example, two mounting holes, are formed in the outer circumference of the second camshaft portion 200b in the radial inward direction of the second camshaft portion 200b, as shown in FIG. 5. The anti-rotation members 300 are located in the mounting holes 220. When the second camshaft portion 200b rotates in the counterclockwise direction at a speed equal to or greater than a predetermined speed, the above-described anti-rotation members 300 is moved out of the second camshaft portion 200b by a centrifugal force that is generated by the rotation of the second camshaft portion 200b.

Furthermore, elastic members 400 are located in the mounting holes 220 so as to elastically support the anti-rotation member 300 in a radial outward direction of the camshaft.

In order to make the anti-rotation members 300 move out using the centrifugal force that is generated by the rotation of the second camshaft portion 200b, the elastic force of each elastic member 400 may be set by appropriately adjusting the weight of a corresponding anti-rotation member 300. This may be determined based on the experimental values that are obtained in advance from experiments.

Recesses 120 are formed in the inner circumference of the body 100 so as to be engaged with the anti-rotation members 300, which are moved out by the rotation of the second camshaft portion 200b. In this case, the recesses 120 may be formed in the radial inward direction of the body 100.

For example, when the ignition key is rotated at a speed equal to or greater than a predetermined speed in the counterclockwise direction because a driver is quickly turning the ignition key, the anti-rotation members 300, which are provided in the second camshaft portion 200b, are moved out of the second camshaft portion 200b prior to the operation of the solenoid 500, and are then engaged with the recesses 120 formed in the body 100, thus restricting the rotation of the camshaft 200. In this case, it is preferred that the anti-rotation members 300 be configured to be moved out when the ignition key is located at the position of the 'ACC' terminal.

After the anti-rotation member 300 is engaged with the recesses 120 formed in the body 100, as described above, the ignition key is slowly turned in the clockwise direction by the driver and the anti-rotation members 300 is moved back into the mounting holes 220 by the elastic member 400, as shown in FIG. 6.

In various embodiments of the present invention, each of the recesses 120, which are formed in the body 100, may be formed such that the bottom thereof has an inclination. In this case, when the second camshaft portion 200b is rotating in the clockwise direction, anti-rotation member 300 engaged with the recess 120 can be smoothly moved out of the second camshaft portion 200b. For this purpose, one end of each anti-rotation member 300 may be formed to have an inclination so as to correspond to the inclination of a corresponding recess 120.

With this structure, even if the driver rotates the second camshaft portion 200b in a high speed in a clockwise direction, the anti-rotation member 300 is not engaged with the recess 120.

The anti-rotation members 300 mounted in the mounting holes 220 are elastically supported in the radial outward direction by the elastic members 400 located in the mounting holes 220. When the ignition key is rotated at a speed smaller than the predetermined speed in the counterclockwise direction as the driver is turning the ignition key, the anti-rotation members 300 are not moved out as shown in FIG. 7, whereby a key locking function can be performed according to the operation of the solenoid 500.

As described above, in the present invention, when the ignition key is rotated at a speed equal to or greater than the predetermined speed in the counterclockwise direction in the state in which a shift lever is located at a position other than the position of 'P,' the anti-rotation members are moved out, and thus the camshaft can be prevented from being rotated to the position of 'LOCK' prior to the operation of the solenoid. Accordingly, the removal of the key can be prevented.

The operation of the key interlock device according to the present invention is described below.

When a shift lever is located at a position other than the position of 'P,' a signal is transmitted from a parking location switch unit, which is provided in the shift lever, to the control unit. In this case, the control unit receives an 'IG1' signal, in addition to the signal transmitted from the parking location switch unit. For example, when the 'IG1' signal is in an ON state, no power is applied to the solenoid.

Subsequently, when it is detected that the 'IG1' signal is changed from an 'ON' state to an 'OFF' state by rotating the ignition key from the 'ON' terminal to the 'ACC' terminal in the state in which the shift lever is located at a position other than the position of 'P,' for example, the position of drive, power is applied to the solenoid.

In this case, the push unit 600 is pushed by the solenoid 500 and, subsequently, the camshaft 200 is engaged with the push unit 600, whereby the rotation of the ignition key from the position of the 'ACC' terminal to the position of 'LOCK' is blocked. Accordingly, the removal of the ignition key can be prevented.

In this case, when the ignition key is rotated by the driver at a speed equal to or greater than the predetermined speed, the anti-rotation members 300 provided in the camshaft 200 are moved out of the camshaft 200, and thus the camshaft 200 is prevented from rotating to the position of 'LOCK' prior to the operation of the solenoid 500.

Figure 8:
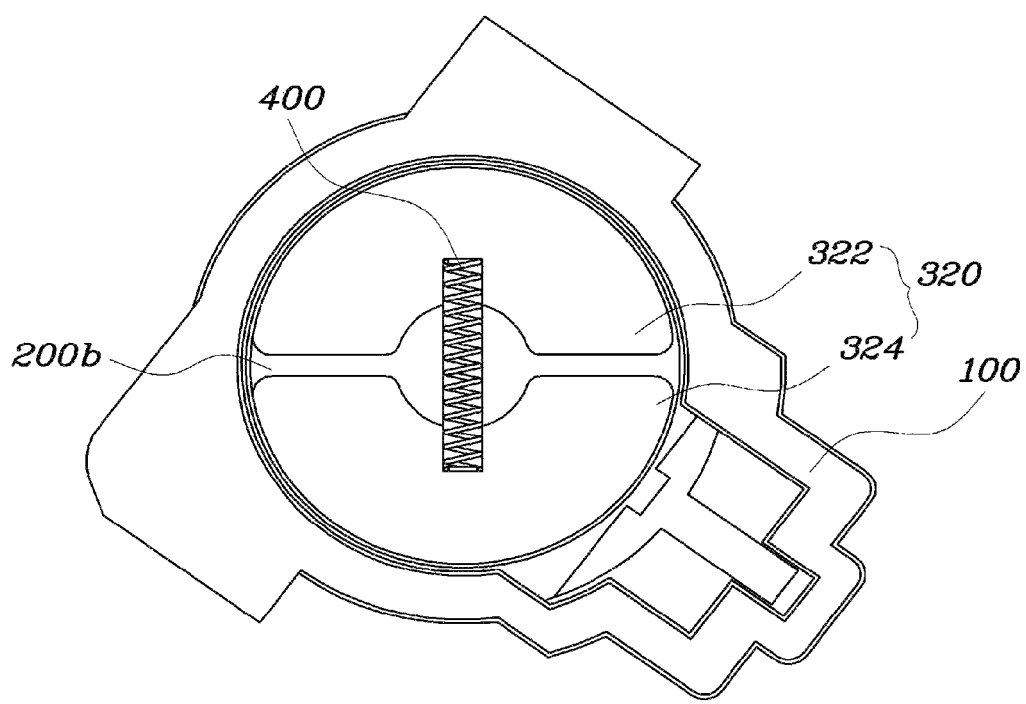
FIG. 8 is a sectional view showing a modification of the exemplary key interlock device according to the present invention, in which anti-rotation members are provided.

FIG. 8 is a sectional view showing a modification of the key interlock device according to the present invention, in which anti-rotation members are provided.

Referring to FIG. 8, in various embodiments, one or more anti-rotation members 320, for example, two anti-rotation members 322 and 324, are located around a camshaft, in particular, around a second camshaft portion 200b, and are formed to have a circular plate shape. An elastic member 400, for example a spring, is located in the central portion of the two anti-rotation members 322 and 324.

In this case, a through hole may be formed, for example, in a connection part (not shown) located between the first and second camshaft portions 200a and 200b of the camshaft or in the central portion of the second side of the first or second camshaft portion 200a or 200b so that the elastic member 400 can be mounted in the central portion of the anti-rotation members 322 and 324.

Two mounting holes may be formed in the respective central portions of the anti-rotation members 322 and 324 to receive and support both ends of the elastic member 400, whereby the two anti-rotation members 322 and 324 can be pushed so as to be distanced from each other or can be pulled to become close to each other.

When the ignition key is rotated at a speed equal to or greater than a predetermined speed in the counterclockwise direction in the state in which the shift lever is located at a position other than the position of 'P,' the two anti-rotation members 322 and 324 are expanded against the elasticity of the elastic member 400 due to a centrifugal force, whereby the outer surfaces of the anti-rotation members 322 and 324 are brought into contact with the inner surface of the body 100. Accordingly, the camshaft can be prevented from rotating to the position of 'LOCK' prior to the operation of the solenoid.

The present invention is provided with the anti-rotation members using a centrifugal force, so that the camshaft can be prevented from rotating to the position of 'LOCK' when the key is turned at a time prior to the operating time of the solenoid.

Although the two anti-rotation members are used as described above, the preset invention is not limited to the number of anti-rotation members, and it is apparent that three or more anti-rotation members may be used.

For convenience in explanation and accurate definition in the appended claims, the term "inward" is used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. A key interlock device for preventing removal of an ignition key of a vehicle, comprising:
    a body;
    a camshaft rotatably provided in the body and connected to an ignition key manipulation unit, wherein the camshaft is rotated by manipulation of the ignition key in the ignition key manipulation unit; and
    at least one anti-rotation member coupled to the camshaft in the camshaft and elastically biased toward a center of the camshaft;
    wherein an end portion of the at least one anti-rotation member is engaged with the body when the camshaft rotates by manipulation of the ignition key beyond a predetermined speed in one direction so as to restrict rotation of the camshaft, and
    wherein the end portion of the at least one anti-rotation member is disengaged with the body when the camshaft rotates in a reverse direction or rotates below the predetermined speed by manipulation of the ignition key.

2. The key interlock device as set forth in claim 1, wherein the at least one anti-rotation member is configured to move to the body from the camshaft by a centrifugal force generated to the at least one anti-rotation member when the camshaft rotates beyond the predetermined speed in the one direction to restrict the rotation of the camshaft.

3. The key interlock device as set forth in claim 2, wherein the at least one anti-rotation member is elastically coupled by at least an elastic member connected to the camshaft.

4. The key interlock device as set forth in claim 2, wherein the camshaft comprises at least a mounting hole in an outer circumference thereof to receive the at least one anti-rotation member and at least an elastic member therein respectively so that the at least one anti-rotation member relatively moves with respect to the camshaft in a radial direction of the camshaft.

5. The key interlock device as set forth in claim 4, wherein the body comprises recesses which are formed in an inner circumference thereof in a radial inward direction, the recesses engaging with the at least one anti-rotation member when the camshaft rotates beyond the predetermined speed in the one direction.

6. The key interlock device as set forth in claim 5, wherein a bottom of the respective recesses is formed of an inclination in the one direction of the rotation so that the at least one anti-rotation member engaged with the recess can be moved back by the at least an elastic member into the at least a mounting hole of the camshaft that is rotating in the reverse direction.

7. The key interlock device as set forth in claim 2, wherein the at least one anti-rotation member is slidably coupled to the camshaft so as to move in a radial direction thereof and formed to have a circular plate shape corresponding to an inner circumference of the body, wherein the at least one anti-rotation member is elastically coupled to the camshaft.

8. The key interlock device as set forth in claim 7, wherein an elastic member is located in and coupled to a central portion of the camshaft.

9. The key interlock device as set forth in claim 8, wherein the at least one anti-rotation member includes holes which are recessed in the camshaft and both ends of the elastic member are coupled to the respective hole of the at least one anti-rotation member.

* * * * *